US008626791B1

(12) United States Patent
Lin et al.

(10) Patent No.: US 8,626,791 B1
(45) Date of Patent: *Jan. 7, 2014

(54) PREDICTIVE MODEL CACHING (75) Inventors: Wei-Hao Lin, New York, NY (US);
Travis H. K. Green, New York, NY (US); Robert Kaplow, New York, NY (US); Gang Fu, Kearny, NJ (US);
Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,882

(22) Filed: Jun. 14, 2011

(51) Int. Cl.
*G06F 17/30* (2006.01)

(52) U.S. Cl.
USPC ........... 707/778; 707/776; 707/777; 707/810; 706/12; 706/21

(58) Field of Classification Search
CPC ................................ G06F 17/00; G06F 17/30
See application file for complete search history.

(56) References Cited

U.S. PATENT DOCUMENTS

| | | | | |
|---|---|---|---|---|
| 5,602,761 A * | 2/1997 | Spoerre et al. | ................. | 702/179 |
| 5,727,128 A * | 3/1998 | Morrison | ......................... | 706/45 |
| 5,729,661 A * | 3/1998 | Keeler et al. | ..................... | 706/16 |
| 5,752,007 A * | 5/1998 | Morrison | ......................... | 703/2 |
| 5,842,189 A * | 11/1998 | Keeler et al. | ..................... | 706/16 |
| 5,862,513 A * | 1/1999 | Mezzatesta et al. | ............... | 702/9 |
| 5,933,345 A * | 8/1999 | Martin et al. | ..................... | 700/44 |
| 6,038,528 A * | 3/2000 | Mammone et al. | ........... | 704/203 |
| 6,063,028 A * | 5/2000 | Luciano | ......................... | 600/300 |
| 6,292,830 B1 * | 9/2001 | Taylor et al. | ..................... | 709/224 |
| 6,317,731 B1 * | 11/2001 | Luciano | ......................... | 706/21 |
| 6,498,993 B1 * | 12/2002 | Chen et al. | ....................... | 702/35 |
| 6,519,534 B2 * | 2/2003 | Chen et al. | ....................... | 702/34 |
| 6,591,254 B1 * | 7/2003 | Keeler et al. | ..................... | 706/21 |
| 6,823,334 B2 * | 11/2004 | Vishnubhotla et al. | ................ | 1/1 |
| 6,917,952 B1 * | 7/2005 | Dailey et al. | ........................... | 1/1 |
| 6,941,301 B2 * | 9/2005 | Ferguson et al. | ..................... | 1/1 |
| 6,944,616 B2 * | 9/2005 | Ferguson et al. | ..................... | 1/1 |
| 7,020,642 B2 * | 3/2006 | Ferguson et al. | ................. | 706/21 |
| 7,054,847 B2 * | 5/2006 | Hartman et al. | ................ | 706/12 |
| 7,124,054 B2 * | 10/2006 | Kim et al. | ..................... | 702/181 |
| 7,167,871 B2 * | 1/2007 | Farahat et al. | ........................ | 1/1 |
| 7,188,117 B2 * | 3/2007 | Farahat et al. | ................ | 707/688 |

(Continued)

OTHER PUBLICATIONS

Ozawa, Seiichi, "A Multitask Leaning Model for Online Pattern Recognition," Mar. 2009, IEEE Transactions on Neural Networks, vol. 20, No. 3., pp. 430-445.*

(Continued)

*Primary Examiner* — Farhan Syed
(74) *Attorney, Agent, or Firm* — Fish & Richardson P.C.

(57) ABSTRACT

Methods, systems, and apparatus, including computer programs encoded on one or more computer storage devices, for caching predictive models are described. Records are obtained, each record including a time of a previously submitted predictive request and an identifier of a trained predictive model. A trained scheduling model is generated using the records as training data. A set of identifiers of trained predictive models are determined from a plurality of trained predictive models that are stored in a secondary memory of a computing system. The target time is inputted to the trained scheduling model. In response, a second predictive output is received that comprises the set of identifiers. A set of trained predictive models are obtained that correspond to the set of identifiers from the secondary memory. The set of trained predictive models are stored in a primary memory of the computing system.

19 Claims, 4 Drawing Sheets

(56) References Cited

U.S. PATENT DOCUMENTS

| | | | |
|---|---|---|---|
| 7,349,919 B2 | 3/2008 | Russell et al. | |
| 7,599,897 B2* | 10/2009 | Hartman et al. | 706/15 |
| 7,643,989 B2* | 1/2010 | Deng et al. | 704/209 |
| 8,046,058 B2* | 10/2011 | Lin et al. | 600/509 |
| 8,175,897 B2* | 5/2012 | Lee et al. | 705/4 |
| 8,209,271 B1 | 6/2012 | Lin et al. | |
| 8,209,274 B1 | 6/2012 | Lin et al. | |
| 8,229,864 B1 | 7/2012 | Lin et al. | |
| 8,250,009 B1* | 8/2012 | Breckenridge et al. | 706/14 |
| 2002/0052699 A1* | 5/2002 | Chen et al. | 702/34 |
| 2003/0033194 A1* | 2/2003 | Ferguson et al. | 705/10 |
| 2003/0033587 A1* | 2/2003 | Ferguson et al. | 717/104 |
| 2003/0078683 A1* | 4/2003 | Hartman et al. | 700/44 |
| 2003/0139828 A1* | 7/2003 | Ferguson et al. | 700/53 |
| 2003/0140023 A1* | 7/2003 | Ferguson et al. | 706/21 |
| 2003/0140039 A1* | 7/2003 | Ferguson et al. | 707/4 |
| 2003/0149603 A1* | 8/2003 | Ferguson et al. | 705/7 |
| 2003/0177117 A1* | 9/2003 | Vishnubhotla et al. | 707/5 |
| 2003/0212851 A1 | 11/2003 | Drescher et al. | |
| 2004/0133531 A1* | 7/2004 | Chen et al. | 706/8 |
| 2005/0159996 A1* | 7/2005 | Lazarus et al. | 705/10 |
| 2005/0234753 A1 | 10/2005 | Pinto et al. | |
| 2006/0100721 A1* | 5/2006 | Piche | 700/47 |
| 2006/0111993 A1* | 5/2006 | Lawrence et al. | 705/35 |
| 2007/0150424 A1* | 6/2007 | Igelnik | 706/15 |
| 2007/0158040 A1* | 7/2007 | Benaoudia et al. | 162/49 |
| 2007/0282766 A1* | 12/2007 | Hartman et al. | 706/15 |
| 2007/0288641 A1* | 12/2007 | Lee et al. | 709/227 |
| 2009/0030864 A1* | 1/2009 | Pednault et al. | 706/45 |
| 2009/0106178 A1 | 4/2009 | Chu | |
| 2010/0205008 A1* | 8/2010 | Hua et al. | 705/3 |
| 2011/0184884 A1* | 7/2011 | Lyons et al. | 705/36 R |

OTHER PUBLICATIONS

Wang, Zheng, et al., "Mapping Parallelism to Multi-cores: A Machine Learning Based Approach," Feb. 14-18, 2009, ACM, pp. 75-84.*

Deshpande, Amol., et al., "Model-Driven Data Acquisition in Sensor Network," 2004, Proceedings of the 30th VLDB Conference, pp. 588-599.*

Yang, Quiang, et al., "Mining Web Logs for Prediction Models in WWW Caching and Prefetching," 2001, KDD '01, ACM, pp. 473-478.*

Lempel, Ronny, et al., "Predictive Caching and Prefetching of Query Results in Search Engines," May 20-24, 2003, ACM, pp. 19-28.*

Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online]. [Retrieved on May 18, 2010]. Retrieved from the Internet: <URL: http://www.uclassify.com/>, 16 pages.

Zementis web pages [online]. [Retrieved on May 18, 2010]. Retrieved from the Internet: <URL: http://www.zementis.com/>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

PREDICTIVE MODEL CACHING

TECHNICAL FIELD

This specification relates to management of predictive models.

BACKGROUND

Predictive analytics generally refers to techniques for extracting information from data to build a model that can predict an output from a given input. Predicting an output can include predicting future trends or behavior patterns or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively.

Computer systems frequently have multiple different types of memory that operate at different speeds. Primary storage modules (for example, Dynamic-Random Access Memory (DRAM) modules) are fast to access but are relatively expensive. In contrast, secondary storage modules (for example, hard drives) are inexpensive but slower to access. Generally, computer systems read programs and data from secondary storage into primary storage before executing the program.

SUMMARY

This document describes techniques for predictive model caching.

In general, one innovative aspect of the subject matter described in this specification can be embodied in methods that include the actions of obtaining a plurality of records, each record including a time of a previously submitted predictive request and an identifier of a trained predictive model that provided a first predictive output in response to the previously submitted predictive request. The actions include generating a trained scheduling model using the records as training data. The actions include in association with a target time, determining a set of identifiers of trained predictive models from a plurality of trained predictive models that are stored in a secondary memory of a computing system. The actions include inputting the target time to the trained scheduling model. The actions include receiving in response a second predictive output that comprises the set of identifiers. The actions include obtaining a set of trained predictive models that correspond to the set of identifiers from the secondary memory. The actions also include storing the set of trained predictive models in a primary memory of the computing system, wherein the primary memory comprises volatile memory and the secondary memory comprises a non-volatile memory.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The time may include at least one of a group consisting of a date, a day of a week, and a time of the day. The actions may include obtaining a portion of the records submitted by a single user. The actions may include generating a trained individual scheduling model using the portion of the records as training data. Determining the set of model identifiers may include inputting the target time to the trained individual scheduling model. Determining the set of model identifiers may include receiving in response a third predictive output that comprises the set of identifiers. Determining the set of identifiers may include obtaining a size of an identified predictive model identified by an identifier of the set of identifiers and determining that the size is below a threshold value. Determining the set of identifiers may also include identifying a most recently used predictive model. The actions may include generating a score for each model identifier in the set of identifiers. The actions may include obtaining at least one predictive model from the secondary memory based on the set of identifiers comprises comparing the score of each model identifier in the set of model identifiers. Each record may include a geographic region and determining the set of identifiers may include providing a target geographic region to the trained collective scheduling model. The actions may include receiving a predictive request submitted to a model of the set of trained predictive models; obtaining the model from the primary memory; and providing the predictive requests to the model.

Particular embodiments of the subject matter described in this specification can be implemented so as to realize one or more of the following advantages: latency can be reduced, and memory resources may be efficiently utilized. The utilization of computer resources may be improved.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
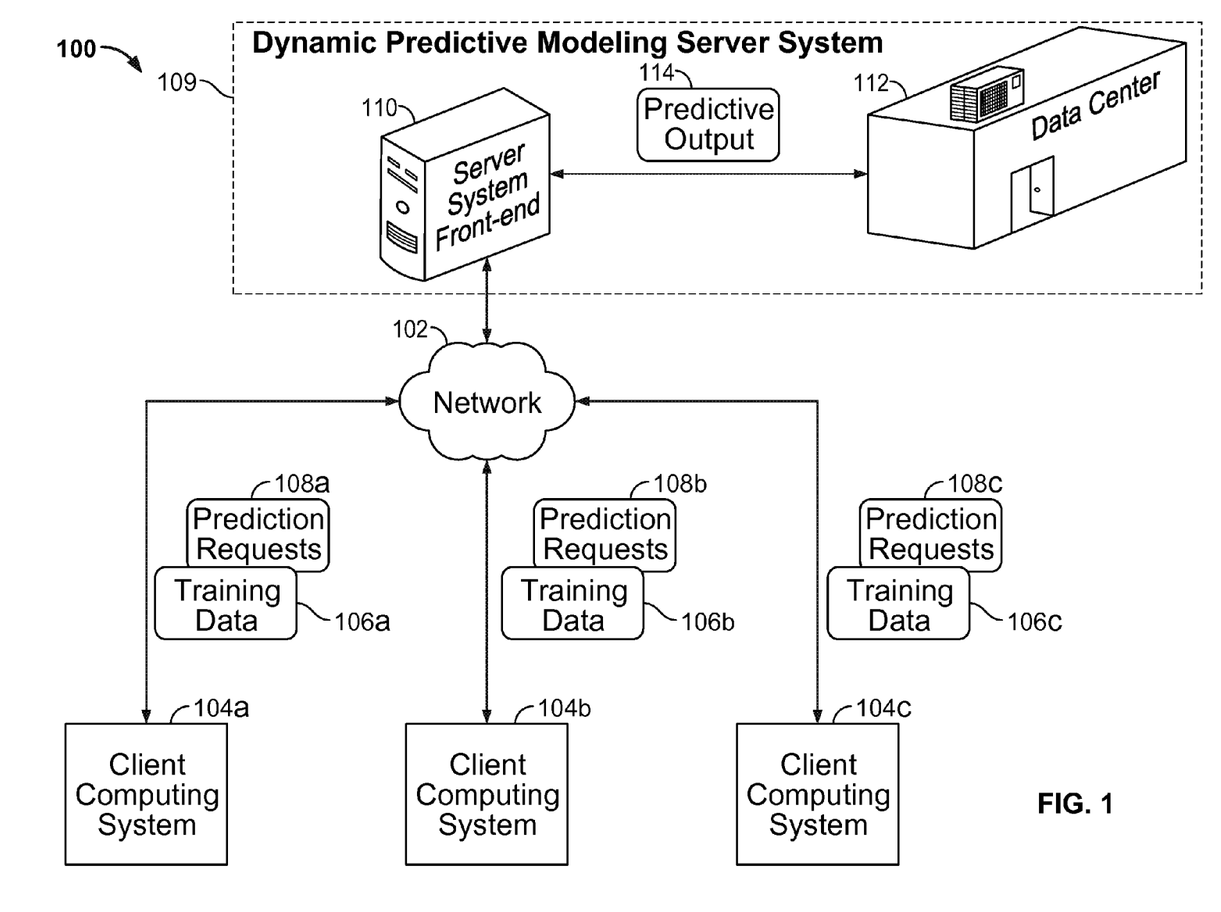
FIG. 1 is a schematic representation of an example system that provides a predictive analytic platform.

FIG. 1 is a schematic representation of an example system that provides a predictive analytic platform. The system 100 includes multiple client computing systems 104*a-c* that can communicate with a predictive modeling server system 109. In the example shown, the client computing systems 104*a-c* can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large number of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise. The system 100 also allows training data 106b and training data 106c to be uploaded from the client computing system 104b and the client computing system 104c, respectively.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing systems 104a, 104b, 104c can transmit prediction requests 108a, 108b, 108c over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
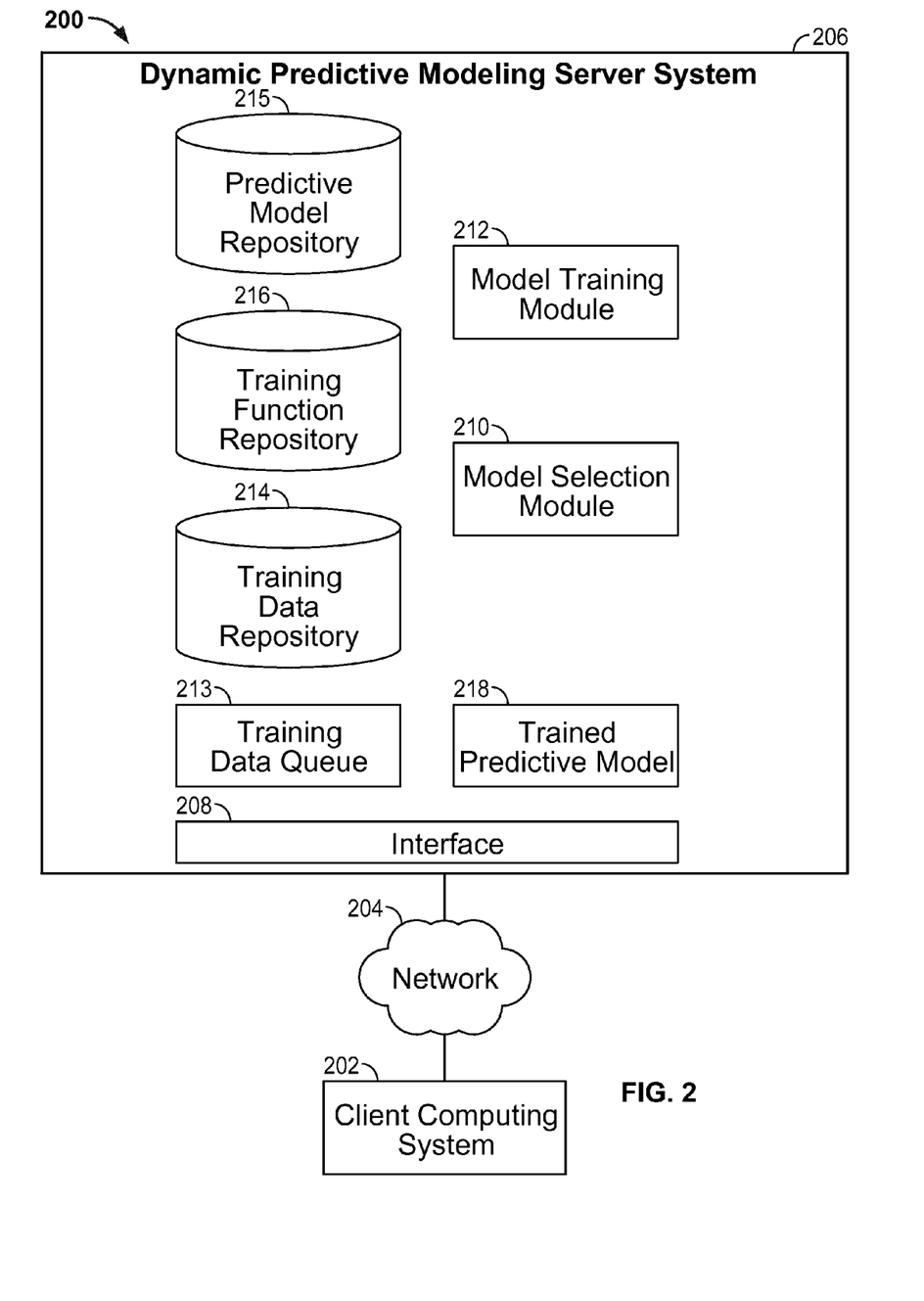
FIG. 2 is a schematic block diagram showing an example system for providing a dynamic predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations, the interface 208 can be implemented as one or more modules adapted to interface with components included in the predictive modeling server system 206 and the network 204, for example, the training data queue 213, the training data repository 214, the model selection module 210 and/or the trained model repository 218.

From the perspective of the client computing system, the client computing system 202 uploads training data (i.e., the initial training data) to the predictive modeling server system 206 over the network 204. In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218.

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model. In response, the client computing system receives a predictive output generated by the trained predictive model from the input data.

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Winnow, Support Vector Machine (SVM) Analogue, Maximum Entropy (MaxEnt) Analogue, Gradient based (FOBOS) and AdaBoost with Mixed Norm Regularization. The training function repository 216 can include one or more of these example training functions.

Multiple predictive models, which can be all or a subset of the available predictive models, are trained using some or all of the training data. In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyperparameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyperparameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected. In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202. In response, the input data is input to the trained predictive model 218 and a predictive output generated by the trained model. The predictive output is provided; it can be provided to the client computing system.

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Figure 3:
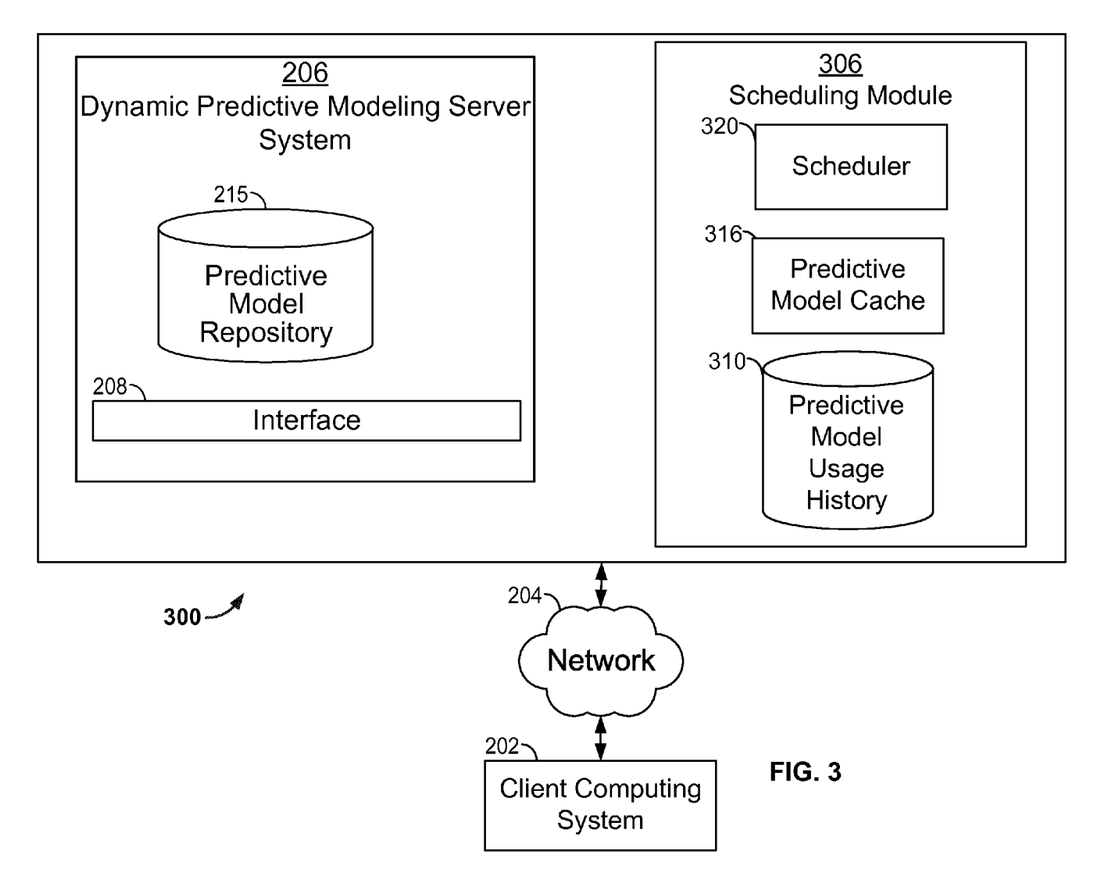
FIG. 3 is a schematic block diagram showing an example system for caching predictive models.

FIG. 3 is a schematic block diagram showing a system 300 including a scheduling module 306 for caching predictive models. The system 300 includes a scheduling module 306 that can be used together with the dynamic predictive modeling server system 206 shown in FIG. 2 and described above. For ease of illustration, only the components of the dynamic predictive modeling server system 206 discussed here are shown in FIG. 3, i.e., the predictive model repository 215 and the interface 208. However, it should be understood that the dynamic predictive modeling server system 206 can include more components than those shown in FIG. 3, e.g., some or all of the components shown in FIG. 2.

For illustrative purposes, the system 300 is shown with one client computer system 202 communicating over a network 204 with a dynamic predictive modeling server system 206. The dynamic predictive modeling server system 206 can be implemented using multiple computers located in one or more physical locations and can serve multiple client computer systems.

Predictive models may be cached in primary memory in order to speed the response time of predictive requests to those models. Generally, a predictive request to a predictive model that is not in primary memory requires that the requested predictive model be located in secondary memory and loaded into primary memory before the predictive request can be satisfied. Generally, primary memory is volatile memory that is directly accessible by the central processing unit (CPU) of the computer. The CPU reads instructions stored in primary memory and executes them as required. Secondary memory is non-volatile memory that is not directly accessible by the CPU of a computer. A computer usually uses its input and output channels to access secondary storage and transfers desired data using primary memory. Any data actively operated on by the CPU is also stored in primary memory. Therefore, any trained predictive model stored in secondary memory is moved into primary memory through an input channel before the model can be executed. Pre-loading predictive models into primary memory before a user submits a predictive request can reduce latency in providing predictive output to the user. Determining which predictive models to pre-load into primary memory can be determined by analyzing historic predictive requests.

A user of the client computer system 202 submits prediction requests to an interface 208 executing on the predictive model server system 206. To satisfy the predictive request, the interface forwards the predictive request to a trained predictive model (not shown). The trained predictive model produces a predictive output which is then sent to the client computing system 202. Generally, the trained predictive model is located and executes at a location remote from the client computing system 202. For example, referring back to FIG. 1, the trained predictive model can reside and execute in the data center 112, thereby not using the resources of the client computing system 202.

The interface 208 stores information about the predictive requests in a predictive model usage data store 310. For example, the interface 208 can store the some or all of: date and time the predictive request was received, the contents of the predictive requests, an identifier that identifies the user of the client computing system 202, an identifier that identifies the predictive model that satisfied the request, and a measure of the size of the predictive model that satisfied the request. For situations in which the systems discussed here collect information about users, the users may be provided with an opportunity to opt in/out of programs or features that may collect information (e.g., the date and time of the predictive request, the identifier that identifies the user of the client computing system 202, etc.).

A scheduler 320 obtains the predictive model usage data collected in the predictive model usage data store 310 over a period of time (for example, a month, two months, a year, multiple years, etc.) The scheduler 320 trains one or more scheduling models using the predictive model usage data as training data. The scheduling models are, themselves, trained predictive models. Trained scheduling models can be either static predictive models or updatable predictive models.

In some implementations, the scheduler 320 trains a scheduling model using the date and time of the predictive request as input and the identifier of the predictive model that satisfied the request as an output. A scheduling model trained in this manner can predict which trained predictive models are likely to receive a predictive request based on date and time. In some implementations, the scheduler 320 can train a first scheduling model using the date of the predictive request as input and the identifier of the predictive model as output and the scheduler 320 can train a second scheduling model using the time of the predictive request as input and the identifier of the predictive model as output, referred to as a collective scheduling model.

The scheduler can also train scheduling models to identify trained predictive models likely to receive predictive requests from a specific user, referring to as an individual scheduling model. In some implementations, users may be grouped together based on a shared characteristic. For example, users may be associated together based on employer. Users that are employed by the same company may be grouped together. Using the trained scheduling model, the scheduler could determine to load particular trained predictive models on behalf of a particular company. For example, a company may contract with the provider of the trained predictive models to have some of its trained predictive models stored in memory at any given time.

The scheduler 320 can also train a scheduling model to determine trained predictive models that are likely to be used in tandem. In some implementations, the scheduler trains predictive models to analyze correlation patterns in usage.

In some implementations, the scheduler 320 trains separate scheduling models for each trained predictive model. In these implementations, predictive model usage data that corresponds to prediction requests that were satisfied by the trained predictive model are supplied to the scheduling model as a positive test case and predictive model usage data that corresponds to prediction requests that were not satisfied by the trained predictive model are supplied to the scheduling predictive model as a negative test case.

In some implementations, the scheduler can train scheduling models for particular geographic regions. For example, the use of predictive models can vary based on a region of the country (e.g. East and West, North and South, Midwest, Plain States, Mid-Atlantic, etc). Multiple data centers within a region may combine their predictive model usage data and train a common set of scheduling models.

The scheduler uses the scheduling models to predict a set of trained predictive models that are likely to receive predictive requests when a given condition is satisfied. The given condition can be the input to the scheduling models and identifiers for the set of trained predictive models are the predictive output from the scheduling models. For example, the condition may be a particular time and date. In this example, the scheduler may determine that on June $1^{st}$ (a Wednesday) at 9:00 am, a particular set of trained predictive models are most likely to receive predictive requests. In another example, the condition may be a particular time and date in a particular geographic region that is served by the predictive models to be loaded into a predictive model cache 316. The scheduler loads the identified predictive models from a predictive model repository 215 in secondary memory and stores the identified predictive models in the predictive model cache 316 in primary memory. Loading predictive models into primary memory prior to likely usage decreases the latency in providing predictive requests, as the time required to load a predictive model from secondary memory to primary memory is no longer included in the time required to service the request.

If the predictive model cache 215 does not have sufficient resources available to load all of the identified predictive models into primary memory, then less frequently used predictive models may be removed from the predictive model cache 316 to free up resources. In some implementations, the scheduling models may be utilized to determine the trained predictive model in the predictive model cache 316, or identified but not yet loaded into the cache 316, that is the least likely to be used, and that trained predictive model is removed or not loaded into the cache 316 in the first place. In some implementations, a predictive model that has recently received a predictive request will remain on the cache 316 regardless of other factors. For example, a trained predictive model that has received a predictive request in the past 5 minutes will remain on the predictive model cache 316.

In some implementations, the scheduler balances the size of the predictive model with the amount of primary memory available to store predictive models. In some implementations, the scheduler stores as many predictive models in the cache as possible. In some implementations, the scheduler compares the size of the predictive model to the likelihood the predictive model will be accessed to determine if the model should be stored in the predictive model cache 316.

Figure 4:
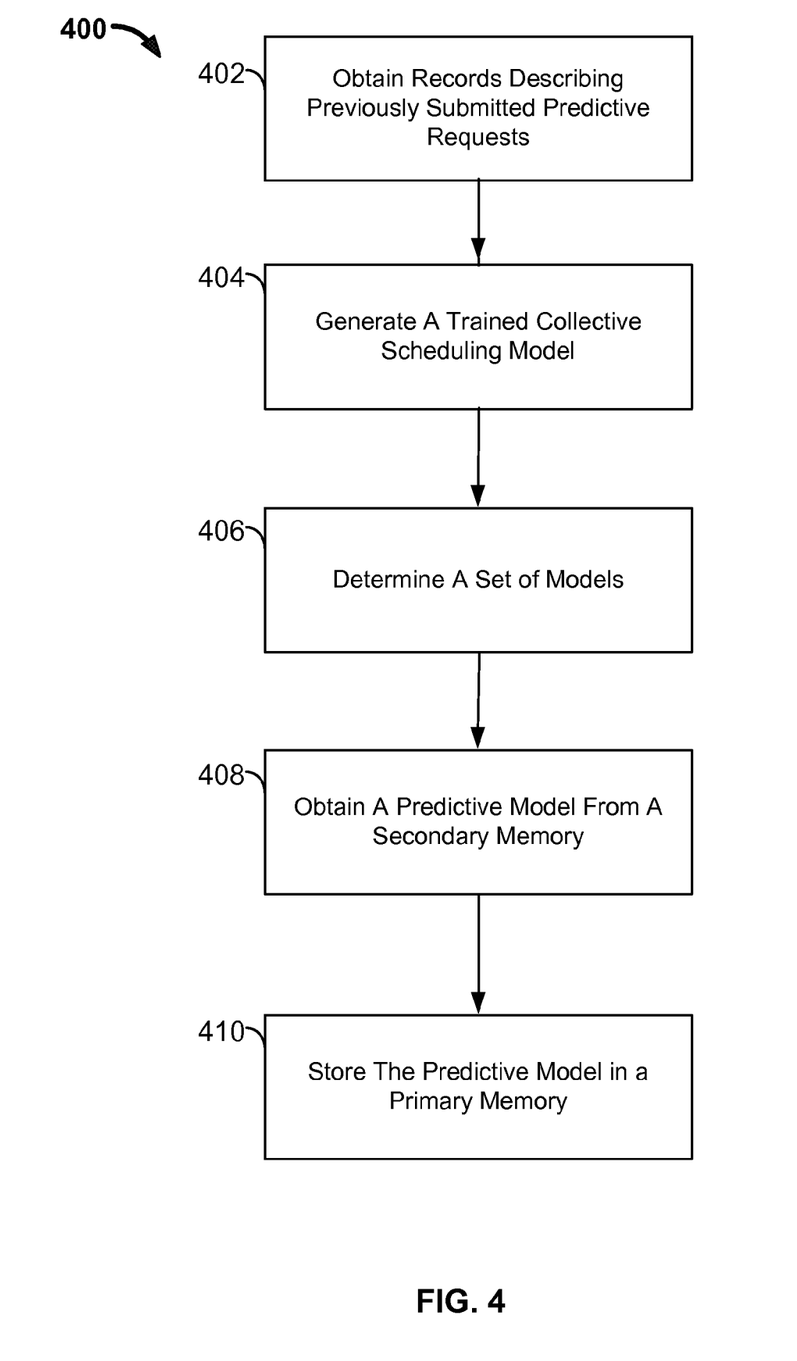
FIG. 4 is a flowchart showing an example process for caching predictive models.

FIG. 4 is a flowchart showing an example of a process 400 for caching predictive models. The process 400 is carried out to identify and cache predictive models that are likely to receive predictive requests. The process 400 can be performed by, for example, the scheduler 320 of FIG. 3. For convenience, the process 400 will be described in terms of a system performing the process.

The process 400 obtains records describing previously submitted predictive requests (Step 402). In some implementations, the previously submitted predictive requests can include a date and time at which the predictive request was submitted and an identifier associated with the predictive model that received the previously submitted predictive request. The records can be stored in a database, for example, a relational database or in a flat file. In some implementations, multiple databases or flat files are accessed to obtain the predictive results.

The process 400 generates a trained scheduling model (Step 404). The trained scheduling model can be generated by training a predictive model using the records as described above. That is, in this example, the data and time at which a predictive request was submitted to a trained predictive model can be input data and the identifier associated with the predictive model that responded to the predictive request can be output data, and the input data and output data together are a training data sample. Such training data samples are used to train the trained scheduling model.

The process 400 determines a set of models that satisfy a given condition (Step 406). For example, the condition can be satisfied by the set of models are models that are most likely to receive predictive requests in the near future. Determining the set of models can include a target time and a target date (i.e., the input data) to the trained scheduling model with the predictive request. The trained scheduling model identifies a set of one or more trained predictive models as the corresponding predictive output.

The process 400 obtains the identified one or more trained predictive models from a secondary memory based on the set of model indicators (step 408). The secondary memory can be, for example, a magnetic storage device, a flash memory device, or other similar memory. Referring again to the example system in FIG. 3, the secondary memory can be the predictive model repository 215. The predictive model repository can be a database, such as a relational database, or in a series of files.

The process 400 stores the set of predictive models in a cache in a primary memory (Step 410). By way of example, the cache can be the predictive model cache 316 shown in the example system in FIG. 3. The primary memory can be, for example, Random Access Memory (RAM) or Dynamic Random Access Memory (DRAM) modules, or other similar memory. The cache can be a data structure capable of maintaining references to predictive models. The cache can obtain a predictive model based on a request including an identifier associated with the predictive model. In some implementations, if the requested predictive model is not in the cache, the cache obtains the requested predictive model from the secondary memory. In other implementations, if the requested predictive model is not in the cache, the cache notifies the requesting process of the error.

Storing a predictive model in the cache results in improved performance by decreasing the latency between when a predictive request is received and when a predictive output can be provided. When a predictive request is received, the cache is checked to determine if a predictive model that can satisfy the predictive request present. If the predictive model is in the cache then the predictive model is accessed directly from primary memory. If the predictive model is not in the cache then the predictive model has to be loaded from secondary memory into primary memory before it can be accessed. By pre-loading the predictive model into the cache prior to the receipt of the predictive request the latency associated with loading the predictive model can be eliminated or reduced.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   maintaining, in a secondary memory of a computing system, a collection of trained predictive models, wherein each trained predictive model in the collection has a respective identifier;
   obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted by a first user;
   generating a trained scheduling model using the plurality of records as training data, wherein the trained scheduling model is a trained individual scheduling model that is specific to the first user;
   identifying, using the trained scheduling model, a particular set of trained predictive models that are most likely to receive predictive requests at a target time;
   selecting, for storing, one or more of the trained predictive models in the particular set of trained predictive models that have a likelihood of receiving a predictive request at the target time that is higher relative to others of the trained predictive models in the particular set of trained predictive models; and
   storing the selected one or more of the trained predictive models in the particular set of trained predictive models in a primary memory of the computing system, wherein the primary memory comprises volatile memory and the secondary memory comprises a non-volatile memory.

2. The method of claim 1, wherein the target time is a date, a day of a week, a time of the day, a date and time of day, or a day or week and time of day.

3. The method of claim 1,
   wherein the first user is a client entity.

4. A computer storage medium encoded with computer program instructions that when executed by one or more computers cause the one or more computers to perform operations comprising:
   maintaining, in a secondary memory of the one or more computers, a collection of trained predictive models, wherein each trained predictive model in the collection has a respective identifier;
   obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted by a first user;
   generating a trained scheduling model using the plurality of records as training data, wherein the trained scheduling model is a trained individual scheduling model that is specific to the first user;
   identifying, using the trained scheduling model, a particular set of trained predictive models that are most likely to receive predictive requests at a target time;
   selecting, for storing, one or more of the trained predictive models in the particular set of trained predictive models that have a likelihood of receiving a predictive request at the target time that is higher relative to others of the trained predictive models in the particular set of trained predictive models; and storing the selected one or more of the trained predictive models in the particular set of trained predictive models in a primary memory of the one or more computers, wherein the primary memory comprises volatile memory and the secondary memory comprises a non-volatile memory.

5. The medium of claim 4, wherein the target time is a date, a day of a week, a time of the day, a date and time of day, or a day or week and time of day.

6. The medium of claim 4,
wherein the first user is a client entity.

7. The medium of claim 4,
wherein each of the plurality of records identifies the respective previously submitted predictive request as having been submitted from a particular geographic region; and
wherein the trained scheduling model is specific to the particular geographic region.

8. A system comprising:
one or more computers and one or more storage devices storing instructions that are operable, when executed by the one or more computers, to cause the one or more computers to perform operations comprising:
maintaining, in a secondary memory of a computing system, a collection of trained predictive models, wherein each trained predictive model in the collection has a respective identifier;
obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted by a first user;
generating a trained scheduling model using the plurality of records as training data, wherein the trained scheduling model is a trained individual scheduling model that is specific to the first user;
identifying, using the trained scheduling model, a particular set of trained predictive models that are most likely to receive predictive requests at a target time;
selecting, for storing, one or more of the trained predictive models in the particular set of trained predictive models that have a likelihood of receiving a predictive request at the target time that is higher relative to others of the trained predictive models in the particular set of trained predictive models; and
storing the selected one or more of the trained predictive models in the particular set of trained predictive models in a primary memory of the computing system, wherein the primary memory comprises volatile memory and the secondary memory comprises a non-volatile memory.

9. The system of claim 8, wherein the target time is a date, a day of a week, a time of the day, a date and time of day, or a day or week and time of day.

10. The system of claim 8,
wherein the first user is a client entity.

11. The system of claim 8,
wherein each of the plurality of records identifies the respective previously submitted predictive request as having been submitted from a particular geographic region; and
wherein the trained scheduling model is specific to the particular geographic region.

12. The method of claim 1, further comprising:
using the trained scheduling model to identify one or more other trained predictive models that are most likely to be used in tandem with the particular set of trained predictive models;
obtaining, from the secondary memory, prior to the target time, the one or more other trained predictive models; and
storing the one or more other trained predictive models in the primary memory.

13. The system of claim 8, wherein the operations further comprise:
using the trained scheduling model to identify one or more other trained predictive models that are most likely to be used in tandem with the particular set of trained predictive models;
obtaining, from the secondary memory, prior to the target time, the one or more other trained predictive models; and
storing the one or more other trained predictive models in the primary memory.

14. The system of claim 8, wherein generating the trained scheduling model comprises:
training a scheduling model using, for each of the plurality of records, the respective time of the previously submitted request as input and the respective identifier of the trained predictive models that satisfied the request as output.

15. The system of claim 8, wherein the operations further comprise:
determining that the primary memory does not have sufficient resources available to store the selected one or more of the trained predictive models; and
removing, from the primary memory, one or more trained predictive models to free up resources.

16. The system of claim 15, wherein the operations further comprise:
selecting, for removing, the one or more trained predictive models that are less likely to receive predictive models at the target time.

17. A computer-implemented method comprising:
maintaining, in a secondary memory of a computing system, a collection of trained predictive models, wherein each trained predictive model in the collection has a respective identifier;
obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted from a particular geographic region;
generating a trained scheduling model using the plurality of records as training data, wherein the trained scheduling model is specific to the particular geographic region;
identifying, using the trained scheduling model, a particular set of trained predictive models that are most likely to receive predictive requests at a target time;
obtaining, from the secondary memory, prior to the target time, the particular set of trained predictive models that are most likely to receive predictive requests at the target time;
selecting, for storing, one or more of the trained predictive models in the particular set of trained predictive models that have a likelihood of receiving a predictive request at the target time that is higher relative to others of the trained predictive models in the particular set of trained predictive models; and storing the selected one or more of the trained predictive models in the particular set of trained predictive models in a primary memory of the computing system, wherein the primary memory comprises volatile memory and the secondary memory comprises a non-volatile memory.

18. A computer storage medium encoded with computer program instructions that when executed by one or more computers cause the one or more computers to perform operations comprising:

maintaining, in a secondary memory of the one or more computers, a collection of trained predictive models, wherein each trained predictive model in the collection has a respective identifier;

obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted from a particular geographic region;

generating a trained scheduling model using the plurality of records as training data, wherein the trained scheduling model is specific to the particular geographic region;

identifying, using the trained scheduling model, a particular set of trained predictive models that are most likely to receive predictive requests at a target time;

obtaining, from the second memory, prior to the target time, the particular set of trained predictive models that are most likely to receive predictive requests at the target time;

selecting, for storing, one or more of the trained predictive models in the particular set of trained predictive models that have a likelihood of receiving a predictive request at the target time that is higher relative to others of the trained predictive models in the particular set of trained predictive models; and storing the selected one or more of the trained predictive models in the particular set of trained predictive models in a primary memory of the one or more computers, wherein the primary memory comprises volatile memory and the secondary memory comprises a non-volatile memory.

19. A system comprising:

one or more computers and one or more storage devices storing instructions that are operable, when executed by the one or more computers, to cause the one or more computers to perform operations comprising:

maintaining, in a secondary memory of a computing system, a collection of trained predictive models, wherein each trained predictive model in the collection has a respective identifier;

obtaining a plurality of records, wherein each record includes a time of a previously submitted predictive request and an identifier of a trained predictive model that provided a predictive output in response to the previously submitted predictive request, and wherein each of the plurality of records identifies the respective previously submitted predictive request as having been submitted from a particular geographic region;

generating a trained scheduling model using the plurality of records as training data, wherein the trained scheduling model is specific to the particular geographic region;

identifying, using the trained scheduling model, a particular set of trained predictive models that are most likely to receive predictive requests at a target time;

obtaining, from the secondary memory, prior to the target time, the particular set of trained predictive models that are most likely to receive predictive requests at a target time;

selecting, for storing, one or more of the trained predictive models in the particular set of trained predictive models that have a likelihood of receiving a predictive request at the target time that is higher relative to others of the trained predictive models in the particular set of trained predictive models; and storing the selected one or more of the trained predictive models in the particular set of trained predictive models in a primary memory of the computing system, wherein the primary memory comprises volatile memory and the secondary memory comprises a non-volatile memory.

* * * * *